US009756274B2

(12) United States Patent
Ardo et al.

(10) Patent No.: US 9,756,274 B2
(45) Date of Patent: Sep. 5, 2017

(54) METHOD AND DEVICE FOR INSERTING A GRAPHICAL OVERLAY IN A VIDEO STREAM

(71) Applicant: Axis AB, Lund (SE)

(72) Inventors: Bjorn Ardo, Lund (SE); Song Yuan, Sodra Sandby (SE)

(73) Assignee: AXIS AB, Lund (SE)

( * ) Notice: Subject to any disclaimer, the term of this patent is extended or adjusted under 35 U.S.C. 154(b) by 40 days.

(21) Appl. No.: 14/956,519

(22) Filed: Dec. 2, 2015

(65) Prior Publication Data

US 2016/0165171 A1    Jun. 9, 2016

(30) Foreign Application Priority Data

Dec. 4, 2014  (EP) .................................. 14196224

(51) Int. Cl.
| | | |
|---|---|---|
| H04N 9/74 | (2006.01) | |
| H04N 5/445 | (2011.01) | |
| H04N 21/431 | (2011.01) | |
| G06T 7/20 | (2017.01) | |
| G06T 13/80 | (2011.01) | |
| H04N 5/265 | (2006.01) | |

(52) U.S. Cl.
CPC ........... *H04N 5/44504* (2013.01); *G06T 7/20* (2013.01); *G06T 13/80* (2013.01); *H04N 5/265* (2013.01); *H04N 21/4312* (2013.01); *G06T 2207/10016* (2013.01)

(58) Field of Classification Search
USPC ....... 348/589, 588, 586, 584, 596, 567, 565, 348/564, 407.1, 425.1, 426.1, 431.1, 700, 348/719, 352, 274, 220.1, 155, 154; 345/473, 474, 641, 629, 638; 375/240.01, 375/240.12, 240.13, 240.26; 386/242, 386/282, 283, 278; 715/716, 719, 726, 715/762, 766, 854
See application file for complete search history.

(56) References Cited

U.S. PATENT DOCUMENTS

| | | | | |
|---|---|---|---|---|
| 5,479,202 A | * | 12/1995 | Beriont .................. | H04N 7/173 348/E7.069 |
| 5,594,509 A | * | 1/1997 | Florin .................. | H04N 5/4403 348/565 |
| 5,621,456 A | * | 4/1997 | Florin .................. | H04N 5/4403 348/E5.103 |
| 5,706,367 A | | 1/1998 | Kondo | |
| 6,226,041 B1 | | 5/2001 | Florencio et al. | |
| 6,268,864 B1 | | 7/2001 | Chen et al. | |
| 6,373,530 B1 | | 4/2002 | Birks et al. | |
| 6,778,224 B2 | | 8/2004 | Dagtas et al. | |
| 7,194,032 B1 | | 3/2007 | Easwar et al. | |
| 7,414,632 B1 | * | 8/2008 | Piazza ...................... | G06F 3/14 345/592 |
| 8,165,226 B2 | | 4/2012 | Schnebly | |

(Continued)

OTHER PUBLICATIONS

EP 14 19 6224.1 European Search Report (dated May 15, 2015).

*Primary Examiner* — Jefferey F Harold
*Assistant Examiner* — Mustafizur Rahman
(74) *Attorney, Agent, or Firm* — Volpe and Koenig, P.C.

(57) ABSTRACT

The present invention relates generally to video communication systems, and more specifically to a method and device for determining a degree of animation of a graphical overlay for a video stream based on a degree of movement in the video stream.

16 Claims, 4 Drawing Sheets

(56) References Cited

U.S. PATENT DOCUMENTS

| | | | |
|---|---|---|---|
| 8,553,037 B2 * | 10/2013 | Smith | G06T 13/40 345/473 |
| 8,640,037 B2 * | 1/2014 | Goodwin | G06F 3/0484 715/760 |
| 8,681,874 B2 | 3/2014 | Cheng et al. | |
| 8,774,264 B2 | 7/2014 | Nakajima | |
| 2002/0030101 A1 | 3/2002 | Inoue et al. | |
| 2002/0080163 A1 * | 6/2002 | Morey | H04N 7/17318 715/727 |
| 2004/0027369 A1 * | 2/2004 | Kellock | G11B 27/34 715/716 |
| 2004/0203374 A1 * | 10/2004 | Zilliacus | H04M 1/7253 455/41.2 |
| 2005/0264583 A1 * | 12/2005 | Wilkins | G09G 5/397 345/629 |
| 2006/0109270 A1 * | 5/2006 | Perey | G06T 15/005 345/427 |
| 2006/0123340 A1 * | 6/2006 | Bailey | G06F 9/44526 715/700 |
| 2007/0188653 A1 | 8/2007 | Pollock et al. | |
| 2008/0019665 A1 * | 1/2008 | Huang | G11B 27/3027 386/278 |
| 2008/0130748 A1 * | 6/2008 | Robers | H04N 19/61 375/240.16 |
| 2009/0046595 A1 * | 2/2009 | Clark | H04L 43/0829 370/252 |
| 2009/0106002 A1 * | 4/2009 | Viswanathan | G05B 17/02 703/6 |
| 2010/0192063 A1 * | 7/2010 | Saoumi | G09B 19/0053 715/707 |
| 2010/0312608 A1 | 12/2010 | Shan et al. | |
| 2011/0292992 A1 | 12/2011 | Sirivara | |
| 2012/0154591 A1 * | 6/2012 | Baur | B60R 1/00 348/148 |
| 2012/0212671 A1 * | 8/2012 | Guo | H04N 21/431 348/513 |
| 2013/0216206 A1 * | 8/2013 | Dubin | H04N 7/155 386/282 |
| 2013/0263023 A1 * | 10/2013 | Goodwin | G06F 3/0484 715/760 |
| 2013/0301953 A1 * | 11/2013 | Montague | G06Q 30/0241 382/276 |
| 2014/0002582 A1 * | 1/2014 | Bear | H04N 5/445 348/14.08 |
| 2014/0029911 A1 * | 1/2014 | Takagi | H04N 9/87 386/224 |
| 2014/0201657 A1 * | 7/2014 | Nagamine | G06F 3/04883 715/766 |
| 2014/0215541 A1 * | 7/2014 | Horen | H04N 21/64707 725/109 |
| 2015/0131964 A1 * | 5/2015 | Liu | G08B 13/19665 386/226 |
| 2015/0149967 A1 * | 5/2015 | Bernstein | G06F 3/0482 715/854 |
| 2015/0186944 A1 * | 7/2015 | Forsblom | G06Q 30/0267 705/14.64 |

* cited by examiner

METHOD AND DEVICE FOR INSERTING A GRAPHICAL OVERLAY IN A VIDEO STREAM

FIELD OF INVENTION

The present invention relates generally to video communication systems, and more specifically to a method and device for inserting an animated graphical overlay in a video stream.

BACKGROUND

Digital video systems generally communicate a sequence of digital images from a source, such as a camera, to a destination, such as a display. The communication can be directly from a camera to a live display or the communication can be time delayed by storing the video and displaying it at a later time. The digital images may be compressed or communicated in their native format.

Various system failures within a digital video system may cause the sequence of images to stop, or to lock-up, resulting in a frame freeze condition. For example, a communications fault between the camera capturing a live video stream and the display showing the live video stream may cause such freeze condition. In some critical applications, it is important for an operator to know quickly that the video system has failed. This may be especially true where a static image on the operator's display may cause the operator to erroneously conclude that scene at the source is simply not changing, when in fact the video system is not operating properly. Some examples of critical applications are security monitoring, medical monitoring, military surveillance, navigation, or manufacturing system tracking.

U.S. Pat. No. 8,165,226 (The Boeing Company) allegedly solves this problem by placing a code into each frame of the video stream. The code counts sequentially from one frame to the next and is embedded into a pixel of each frame. Verification at the destination, or display, of the changing code within the frames of the video stream can confirm that the video stream is not in a frame freeze fault condition prior to display. If a fault condition is detected by the code verification process, an operator can be made aware of the fault. However, such a system is complex and requires that the display is connected to a processor running the code verification process.

SUMMARY

In view of the above, an objective of the invention is to solve or at least reduce one or several of the drawbacks discussed above. Generally, the above objective is achieved by the attached independent patent claims.

According to a first aspect, the present invention is realized by a method for inserting a graphical overlay on a video stream during a time period of a video stream, comprising the steps of: estimating a degree of motion of the video stream during the time period of the video stream, determining a degree of animation of the graphical overlay for said time period of the video stream based on the determined degree of motion, inserting the graphical overlay on the video stream during the time period of the video stream. At least a first and a second degree of animation can be determined, wherein the first degree of animation is higher compared to the second degree of animation, wherein the first degree of animation is based on an estimated degree of motion below a threshold and wherein the second degree of animation is based on an estimated degree of motion above the threshold.

By the term "a time period of a video stream" should, in the context of present specification, be understood at least one video frame of the video stream.

The graphical overlay may comprise any type of graphical object, such as a logotype or a representation of an hourglass.

The degree of motion may be estimated by any suitable video motion detection (VIVID) algorithm. VIVID is a way of defining activity in a scene by analyzing image data and differences in a series of images. In its simplest form, the VIVID may be performed by comparing the values of the pixel in one image with the values of the corresponding pixels in a preceding image and count the number of pixels that have changed between the two images. Consequently, the larger the difference between the two images is the higher will the degree of motion be. The estimation of the degree of motion may be performed by analyzing a preceding time period of the video stream (e.g. the last second) and assume that the degree of motion for the current time segment of the video stream is the same.

The present invention is based upon the realization that by inserting a graphical overlay having a degree of animation which is based on the degree of motion of the video stream on which the graphical overlay is placed, an viewer of the video stream can easily see if the scene depicted by the video stream is simply not changing, since in this case the graphical overlay will be animated event though the rest of the image is still, or if the video stream is in a frame freeze condition, since in this case the graphical overlay also will be freezed.

In other words, since the degree of animation is determined such that a lower degree of motion, e.g. below the threshold, will result in a higher degree of animation, and a higher degree of motion, e.g. above the threshold, will result in a lower degree of animation, a scene which is not changing will result in that the graphical overlay will have a higher degree of animation compared to if the scene is indeed moving.

By providing a method that is performed on a time period of the video stream, a more flexible way of determining the degree of animation of the graphical overlay is achieved. The degree of animation may thus be independently assignable for each time period of the video stream.

In other words, the degree of animation of the graphical overlay may be determined for a time period of the video stream, for example 1/30 second (one frame), 1 second, 10 seconds, 1 minute etc. When the degree of animation is determined, it may not yet be known for how long time period this degree of animation will apply. The length of the time period may be based on e.g. properties of the video stream, or a threshold number of frames.

Moreover, by indicating movement, or lack of movement, in the video stream by the degree of animation of the graphical overlay, a reduced complexity of a client displaying the video stream may be achieved since the client only have to display the video stream in an ordinary way and still make the viewer aware of a fault condition due to a frame freeze condition of the video stream.

According to some embodiments, an increased degree of motion corresponds to a decreased degree of animation. This may be advantageous since a video stream with a high degree of motion requires a higher bitrate for transmitting an encoded bitstream comprising the time period of the video stream. Thus, the increase in the bitrate due to the movement of the scene depicted by the video stream may be neutralized by reducing the degree of animation of the graphical overlay. Moreover, by decreasing the animation of the graphical overlay when the scene moves, the attention of the viewer of the video stream including the graphical overlay may advantageously be directed towards the actual movement of the scene and not towards the graphical overlay.

According to some embodiments, if the degree of motion is exceeding a threshold value, the degree of animation of the graphical overlay is determined to be zero. This may further ensure that the attention of the viewer of the video stream including the graphical overlay is directed towards the actual movement of the scene and not towards the graphical overlay. Moreover, the bitrate required for the transmission of the encoded bitstream comprising the time period of the video stream and the graphical overlay may be kept at a reasonable level.

According to some embodiments, a decreased degree of motion corresponds to an increased degree of animation. According to some embodiments, the degree of animation of the graphical overlay may increase up to a threshold degree of animation.

According to some embodiments, the method further comprises the steps of: encoding the time period of the video stream and the graphical overlay into a single encoded bit stream, and transmitting the single encoded bit stream.

According to some embodiments, the video stream is a live video stream. A frame freeze of a live video stream may be especially disadvantageous since a viewer then may miss important incidents that occur in the scene, e.g. a start of a fire or a burglary. By using an animated graphical overlay according to the above, such a frame freeze condition may be quickly noticed and taken care of.

According to some embodiments, the method further comprises the step of: determining a start frame of the time period of the video stream by at least one of: calculating a number of frames since a start frame of a preceding time period of the video stream for which the degree of animation of the graphical overlay was determined, and determining if the calculated number of frames is larger than a threshold value; receiving a pan, tilt and/or zoom (PZT) signal from a PTZ video camera acquiring the video stream; and/or determining a degree of difference between a current frame and a frame of a preceding time period of the video stream for which the degree of animation was determined by performing a block-matching operation between the current frame and the frame of the preceding time period and determining if the degree of difference is larger than a threshold value.

By only determining the degree of animation of the graphical overlay after at least one of the above conditions have been met, the degree of animation of the graphical overlay may be determined at advantageous moments. For example, when a PZT signal is received, the depicted scene in the video stream is probably changed and an adjustment of the degree of animation of the graphical overlay may be needed.

Moreover, by only determining a new degree of animation if the scene in a current frame in the video stream is noticeably different from the scene depicted in the preceding time period where the degree of animation was determined, unnecessary determinations, e.g. adjustments, of the degree of animation may be avoided. Consequently a reduced computational complexity can be achieved.

Furthermore, by not determining a new degree of animation until a certain number of frames has passed since the last determination, unnecessary adjustment of the degree of animation may be avoided. Consequently a reduced computational complexity can be achieved.

According to some embodiments, the step of estimating the degree of motion for the time period of the video stream is performed using at least one of: a subset of data of the time period of the video stream, and a subset of data of a preceding time period of the video stream.

By the term "subset of data" should, in the context of present specification, be understood that according to some embodiment, only a sub-set of the frames comprised in the corresponding time period is used for the estimation, and/or that only a part of each frame is used when estimating the degree of motion. This may reduce the computational complexity of the estimation, and further also reduce the time required for the estimation.

In a second aspect, the present invention provides a computer program product comprising a computer-readable storage medium with instructions adapted to carry out the method according to the first aspect when executed by a device having processing capability.

In a third aspect, the present invention provides a video stream processing device comprising: a motion determining module configured to estimate a degree of motion for a video stream during a time period of the video stream, an animation determining module configured to determine a degree of animation of the graphical overlay for said time period of the video stream based on the determined degree of motion, a graphical overlay inserting module configured to insert the graphical overlay on the video stream during the time period of the video stream.

The animation determining module is configured to determine at least a first and a second degree of animation, wherein the first degree of animation is higher compared to the second degree of animation, wherein the first degree of animation is based on an estimated degree of motion below a threshold and wherein the second degree of animation is based on an estimated degree of motion above the threshold The video processing device may advantageously be a part of a digital video camera, wherein the time period of the video stream is acquired by the digital video camera. This reduces the need of further electronic devices connected to the video camera and is e.g. advantageous for assembling reasons and for reducing the required space for mounting the video processing device and the camera.

It should be noted that the video stream processing device may be configured for performing any of the embodiments of the first aspect described above.

In a fourth aspect, the present invention provides a system comprising: a video stream processing device comprising: a motion determining module configured to estimate a degree of motion for a video stream during a time period of the video stream, an animation determining module configured to determine a degree of animation of the graphical overlay for said time period of the video stream based on the determined degree of motion, and a graphical overlay inserting module configured to insert the graphical overlay on the video stream during the time period of the video stream. The animation determining module is configured to determine at least a first and a second degree of animation, wherein the first degree of animation is higher compared to the second degree of animation, wherein the first degree of animation is based on an estimated degree of motion below a threshold and wherein the second degree of animation is based on an estimated degree of motion above the threshold The system further comprises an encoder configured to encode the time period of the video stream and the graphical overlay into a single encoded bit stream, a first digital network module configured to transmit the single encoded bit stream via digital network, a second digital network module configured to receive the single encoded bitstream via the digital network, and a decoder configured to decode the single encoded bitstream into a time period of a video stream comprising the graphical overlay.

The system further comprises a client comprising a display configured to display the time period of the video stream.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF THE PREFERRED EMBODIMENTS

Figure 1:
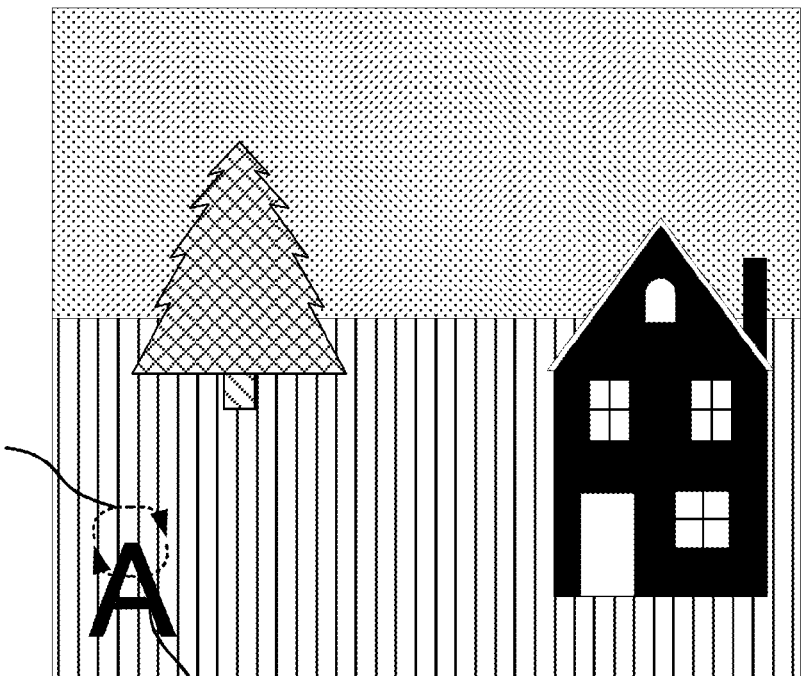
FIG. 1 shows by way of example an unchanging scene from a video stream onto which an animated graphical overlay is inserted.
Figure 2:
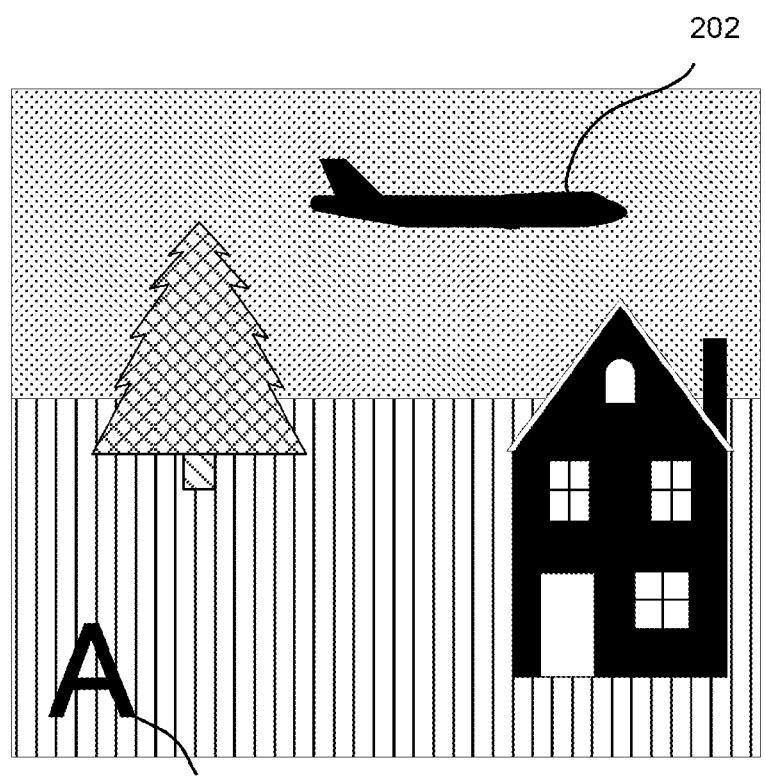
FIG. 2 shows by way of example that the animation of the graphical overlay is stopped as response to an increased degree of motion in the scene from the video stream, FIG. 3 describes by way of example a method for inserting a graphical overlay on a video stream during a time period of a video stream, FIG. 4 schematically describes a video stream processing device, FIG. 5 schematically describes a system including the video stream processing device of FIG. 4 and a display for displaying the video stream including the graphical overlay.

FIGS. 1-2 show snapshots of a time period of a video stream, along with a graphical overlay 102 having different degrees of animation 104, wherein the degree of animation 104 of the graphical overlay 102 for said time period of the video stream is based on a determined degree of motion of the scene depicted in respective figure.

FIG. 1 shows a typical scene which is depicted in a video stream acquired by a camera, for example a monitoring camera. Onto this scene, a graphical overlay 102 is placed. The graphical overlay 102 is in this case a logotype but other types of graphical overlays, such as a representation of a clock or a flag, are equally possible. The degree of motion in the scene in FIG. 1 is low, which means that no major movements take place. The scene comprises a tree which may move a little, but such small movements may be difficult to notice for a viewer of the video stream. For this reason, a degree of animation 104 of the graphical overlay 102 is determined to be above zero, e.g. such that the graphical overlay 102 will rotate, move, spin or any other type of animation, to inform the viewer that the video stream is not in a frame freeze condition.

In FIG. 2, a plane 202 is flying by, and this means that the degree of motion in the scene is increased and thus more noticeable for a viewer of the video stream. For this reasons, the degree of animation of the graphical overlay 102 is determined to be zero. The viewer no longer needs to see a graphical overlay 102 that moves around in order to determine that the video stream is not in a frame freeze condition.

Moreover, when movement takes place in the scene, it is advantageous that the attention of the viewer is directed towards the movement and not towards an animated logotype 102. Moreover, for most video encoding methods, such as H.264, H.265, MPEG 1, MPEG 2, MPEG 4, a video stream with a lot of motion can be less compressed compared to a video stream with low or no motion. Consequently, the required bitrate for transmitting an encoded bitstream of a video stream with motion is increased. By reducing the degree of animation for the graphical overlay 102 in response to an increased degree of motion in the video stream, the increase in the bitrate due to the movement in the video stream may be neutralized. It should be noted that according to some embodiment, the degree of animation of the graphical overlay 102 is not determined to be zero, but only reduced, compared to degree of animation 104 of the graphical overlay 102 in FIG. 1. When the plane 202 has flied out of the scene depicted by the video stream, the degree of motion in the video stream may yet again decrease. This decreased degree of motion may then correspond to an increased degree of animation of the graphical overlay 102.

Figure 3:
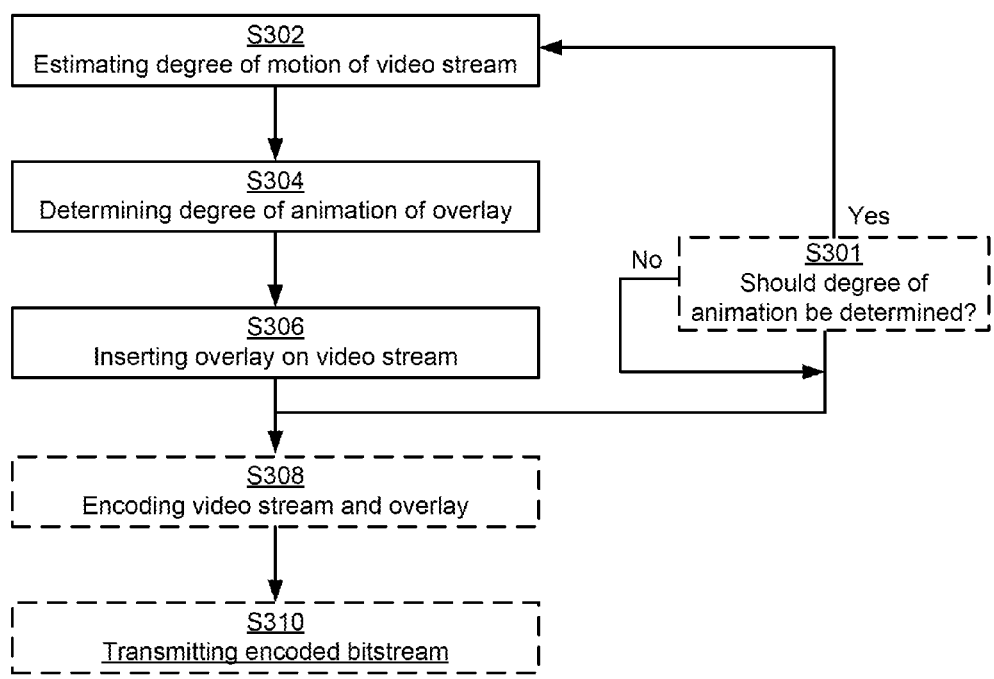

FIG. 3 describe a method for inserting a graphical overlay on a video stream during a time period of a video stream.

The method starts off by estimating S302 a degree of motion, using any suitable VIVID algorithm, of the video stream during the time period of the video stream.

Based on the estimated degree of motion, the degree of animation of the graphical overlay for said time period of the video stream is determined S304. According to some embodiments, the degree of animation is determined by selecting between just two values, either zero (no degree of animation), or X, X being any suitable degree of animation above zero which e.g. means that the graphical overlay will rotate, spin or move. According to other embodiments, the degree of animation is determined by mapping the degree of motion in the video stream against a continuous function to determine the degree of animation.

When the degree of animation has been determined, the overlay is inserted S306 on the video stream during the time period of the video stream. This means that for each frame in the video stream during the time period of the video stream, the graphical overlay is rotated, spun, or moved according to an animation scheme and according to the determined degree of animation (which may be zero which means that no rotation, spin, or moving occur) and then inserted on the frame.

According to some embodiments, the method further comprises the steps of encoding S308 the time period of the video stream and the graphical overlay into a single encoded bitstream, and transmitting S310 the single encoded bitstream.

Also, according to some embodiments, after the graphical overlay has been inserted on the video stream, and possibly at the same time as the video stream and the graphical overlay is encoded S308 into a single encoded bitstream, the method comprises the step of determining S301 a start frame of the next time period of the video stream, i.e. determining when a degree of animation should be determined again. This is done by checking if at least one of the following conditions has been met: calculating a number of frames since a start frame of a preceding time period of the video stream for which the degree of animation of the graphical overlay was determined, and determining if the calculated number of frames is larger than a threshold value; has a pan, tilt and/or zoom signal from a PTZ video camera acquiring the video stream been received; and/or determining a degree of difference between a current frame and a frame of a preceding time period of the video stream for which the degree of animation was determined by performing a block-matching operation between the current frame and the frame of the preceding time period and determining if the degree of difference is larger than a threshold value.

That is, if a certain number of frames in the video stream have passed since the last time the degree of animation was determined, and/or if a PTZ signal has been received, and/or if the content of the frames in the video stream has changed to a certain extent, the steps S302, S304 and S306 are performed again in order to possibly adjust the degree of animation of the graphical overlay.

Figure 4:
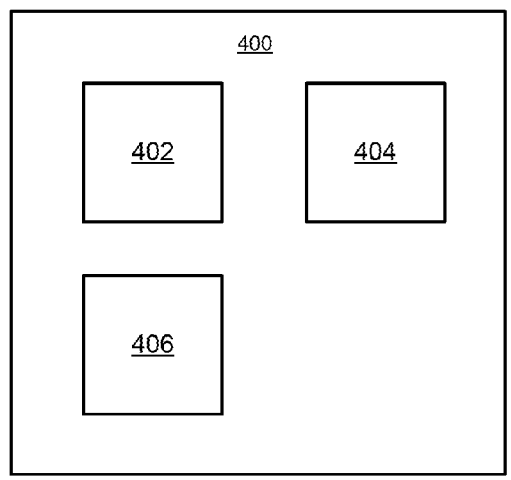

FIG. 4 describes a video stream processing device 400. The video stream processing device comprises a motion determining module 402 configured to estimate a degree of motion of the video stream during the time period of a video stream. Moreover, the video stream processing device comprises an animation determining module 404 configured to determine a degree of animation of the graphical overlay for said time period of the video stream based on the determined degree of motion. The animation determining module 404 is configured to determine at least a first and a second degree of animation, wherein the first degree of animation is higher compared to the second degree of animation, wherein the first degree of animation is based on an estimated degree of motion below a threshold and wherein the second degree of animation is based on an estimated degree of motion above the threshold. As clearly described above, the animation determining module 404 may be configured for determining more than two degrees of animations. Further, the video stream processing device comprises a graphical overlay inserting module 406 configured to insert the graphical overlay on the video stream during the time period of the video stream. The motion determining module 402, the animation determining module 404 and the graphical overlay inserting module 406 may be implemented in software and executed by at least one processor in the video stream processing device 400, for example by a central processing unit (CPU) and/or a graphical processing unit (GPU) of the video stream processing device 400.

Figure 5:
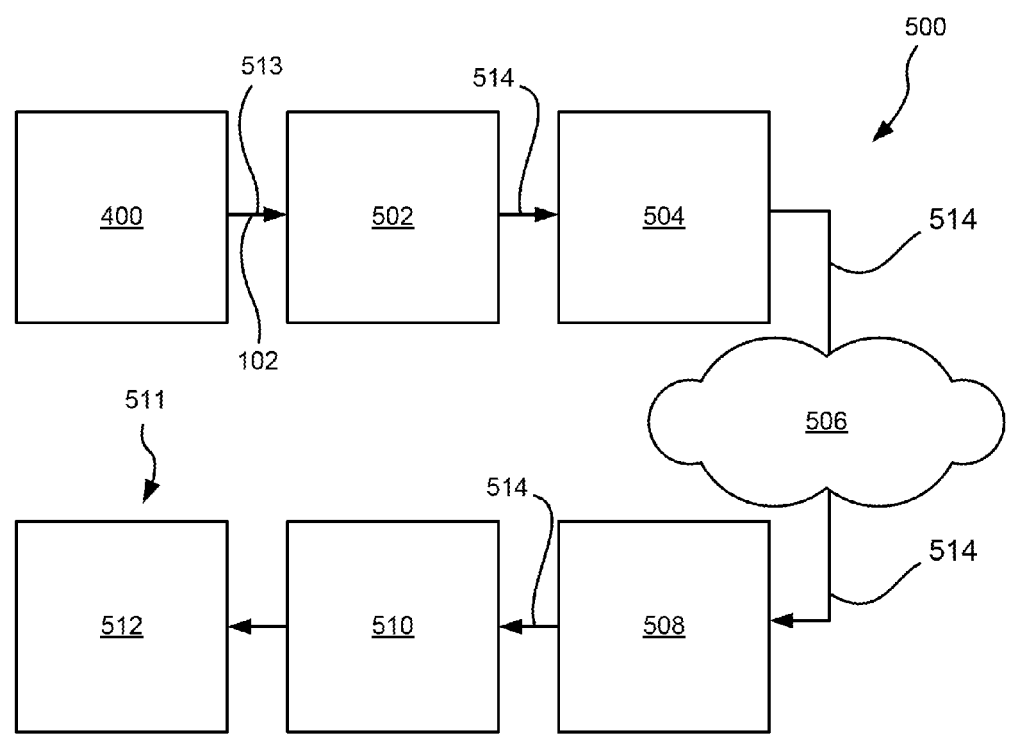

FIG. 5 describes a video system 500 comprising the video stream processing device 400 described in FIG. 4. The time period of the video stream 513 and the graphical overlay 102 is transmitted from the video processing device 400 to an encoder 502 configured to encode the time period of the video stream 513 and the graphical overlay 102 into a single encoded bitstream 514. The encoder may be implemented in software and executed by a processor. It should be noted that the encoder may be part of the video stream processing device 400 or implemented in a separate device. The single encoded bitstream 514 is then transmitted to a first digital network module 504 configured to transmit the single encoded bitstream 514 via digital network 506. The digital network module 504 may be part of the video stream processing device 400 or the encoder 502 or implemented in a separate device.

The single encoded bitstream 514 is received by a second digital network module 508 via the digital network 506. A decoder 510 is configured to decode the single encoded bitstream into a time period of a video stream 514 comprising the graphical overlay. The system further comprises a client 511 which comprises a display 512 configured to display the time period of the video stream comprising the graphical overlay. According to embodiments, the client 511 comprises the digital network module 508 and the decoder 510. The client may for example be a computer, a computer screen, a tablet or a Smartphone.

Figure 6:
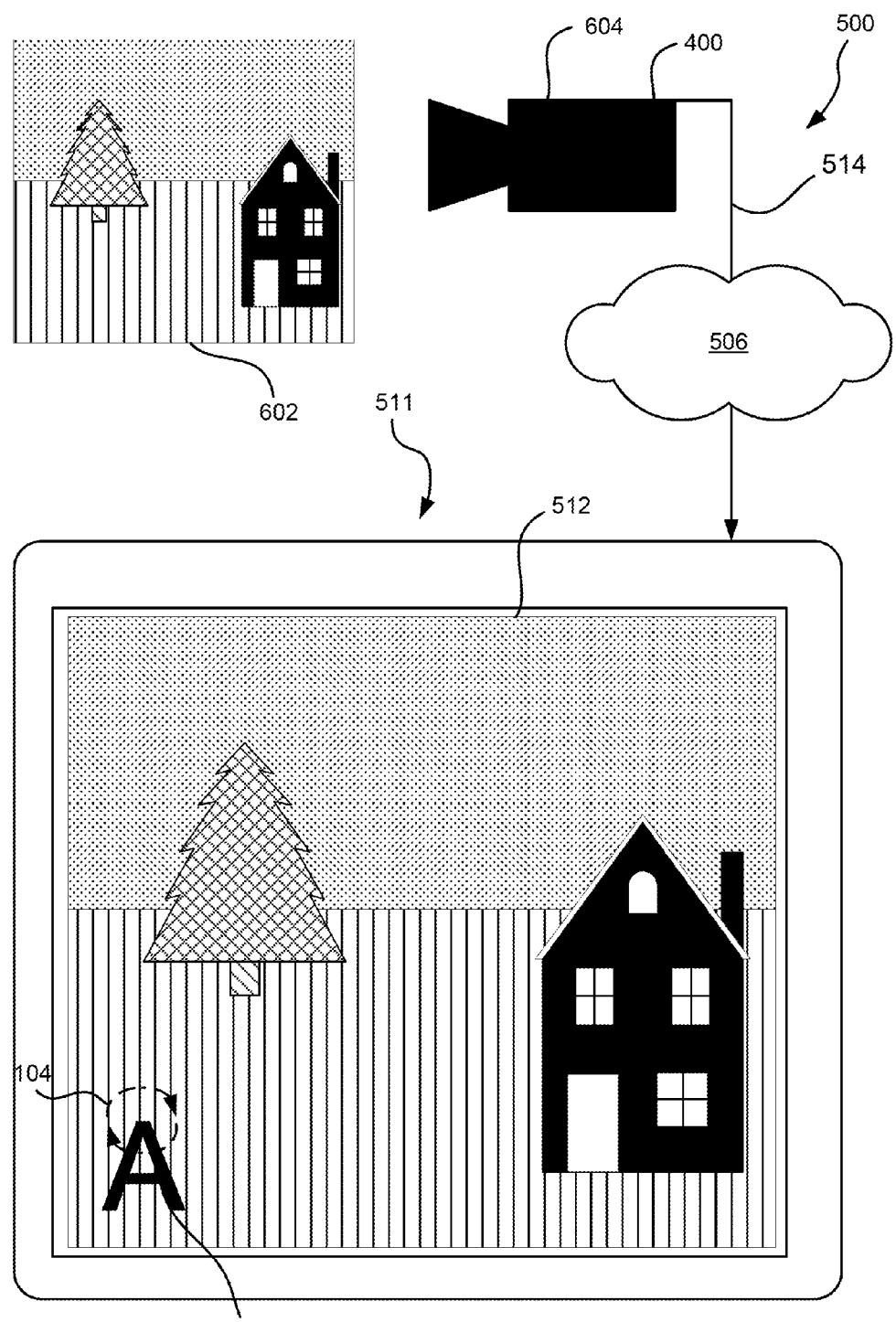
FIG. 6 shows the system of FIG. 5 in action.

FIG. 6 describe the system 500 in action. The video processing device 400, and the digital network module (not shown) and the encoder (not shown), are parts of a digital video camera 604 which acquires a video stream of a scene 602. The single encoded bitstream 514 is transmitted, via the digital network module and the digital network 506, to a client 511. The client comprises a display 512 and further a decoder (not shown) and a digital network module (not shown).

The displayed video stream comprises a graphical overlay 102 which in this particular example has a degree of animation 104 of above zero since the degree of motion in the scene 602 is low, which means that no major movements take place. As discussed above, due to the animated graphical overlay 102, the viewer of the video stream as displayed in the client 511 can rely on that the video stream is not in a frame freeze condition.

It will be appreciated that a person skilled in the art can modify the above-described embodiments in many ways and still use the advantages of the invention as shown in the embodiments above. Thus, the invention should not be limited to the shown embodiments but should only be defined by the appended claims Additionally, as the skilled person understands, the shown embodiments may be combined.

What is claimed is:

1. A method for inserting a graphical overlay on a video stream during a time period of a video stream, comprising the steps of:
    estimating a degree of motion of the video stream during the time period of the video stream,
    determining a degree of animation of the graphical overlay based on the estimated degree of motion, and
    inserting the graphical overlay on the video stream during the time period of the video stream,
    wherein at least a first and a second degree of animation can be determined, wherein the first degree of animation is higher compared to the second degree of animation, wherein the first degree of animation is based on an estimated degree of motion below a threshold and wherein the second degree of animation is based on an estimated degree of motion above the threshold.

2. The method of claim 1, wherein an increased degree of motion corresponds to a decreased degree of animation.

3. The method of claim 2, wherein if the degree of motion is exceeding a threshold value, the degree of animation of the graphical overlay is determined to be zero.

4. The method of claim 1, wherein a decreased degree of motion corresponds to an increased degree of animation.

5. The method of claim 1, further comprising the steps of:
    encoding the video stream during the time period of the video stream and the graphical overlay into a single encoded bit stream, and
    transmitting the single encoded bit stream.

6. The method of claim 1, wherein the video stream is a live video stream.

7. The method of claim 1, wherein the method further comprising the step of:
    determining a start frame of the video stream during the time period of the video stream by performing at least one of:
        calculating a number of frames since a start frame of the video stream during a preceding time period of the video stream for which the degree of animation of the graphical overlay was determined, and determining if the calculated number of frames is larger than a threshold value, receiving a pan, tilt and/or zoom signal from a PTZ video camera acquiring the video stream, determining a degree of difference between a current frame and a frame of the video stream during a preceding time period of the video stream for which the degree of animation was determined by performing a block-matching operation between the current frame and the frame of the video stream during the preceding time period and determining if the degree of difference is larger than a threshold value.

8. The method of claim 1, wherein the step of estimating the degree of motion for the video stream during the time period of the video stream is performed using at least one of:

a subset of data of the video stream during the time period of the video stream, and a subset of data of the video stream during a preceding time period of the video stream.

9. A non-transitory computer program product comprising a computer-readable storage medium with instructions adapted to carry out the method of claim 1 when executed by a device having processing capability.

10. The non-transitory computer program product of claim 9, wherein an increased degree of motion corresponds to a decreased degree of animation.

11. The non-transitory computer program product of claim 9, wherein if the degree of motion is exceeding a threshold value, the degree of animation of the graphical overlay is determined to be zero.

12. The non-transitory computer program product of claim 9, wherein a decreased degree of motion corresponds to an increased degree of animation.

13. The non-transitory computer program product of claim 9, further comprising the steps of:

encoding the video stream during the time period of the video stream and the graphical overlay into a single encoded bit stream, and transmitting the single encoded bit stream.

14. The non-transitory computer program product of claim 9, wherein the video stream is a live video stream.

15. The non-transitory computer program product of claim 9, wherein the method further comprising the step of:

determining a start frame of the video stream during the time period of the video stream by performing at least one of:

calculating a number of frames since a start frame of the video stream during a preceding time period of the video stream for which the degree of animation of the graphical overlay was determined, and determining if the calculated number of frames is larger than a threshold value, receiving a pan, tilt and/or zoom signal from a PTZ video camera acquiring the video stream, determining a degree of difference between a current frame and a frame of the video stream during a preceding time period of the video stream for which the degree of animation was determined by performing a block-matching operation between the current frame and the frame of the video stream during the preceding time period and determining if the degree of difference is larger than a threshold value.

16. The non-transitory computer program product of claim 9, wherein the step of estimating the degree of motion for the video stream during the time period of the video stream is performed using at least one of:

a subset of data of the video stream during the time period of the video stream, and a subset of data of the video stream during a preceding time period of the video stream.

* * * * *